United States Patent [19]

Kuroda et al.

[11] 4,420,601

[45] Dec. 13, 1983

[54] THERMOPLASTIC POLYURETHAN RESIN

[75] Inventors: Yoshimi Kuroda, Osaka; Shichinosuke Ito; Akio Midorikawa, both of Izumi; Kuniomi Terashima, Sakai, all of Japan

[73] Assignee: Dainippon Ink and Chemicals, Inc., Tokyo, Japan

[21] Appl. No.: 353,973

[22] Filed: Mar. 2, 1982

[30] Foreign Application Priority Data

Mar. 5, 1981 [JP] Japan ................................ 56-30445

[51] Int. Cl.³ ...................... C08G 18/10; C08G 18/34; C08G 18/52
[52] U.S. Cl. ......................................... 528/76; 528/66; 528/83; 528/84; 252/62.53; 252/62.54; 427/128
[58] Field of Search ...................... 528/76, 66, 83, 84; 252/62.53, 62.54; 427/128

[56] References Cited

U.S. PATENT DOCUMENTS 3,360,495 12/1967 Muller et al. ...................... 528/76
3,528,948 1/1964 Reuter .................................. 528/83
4,080,318 3/1978 Smith et al. ........................ 528/84
4,182,898 1/1980 Fujiwara et al. .................... 528/66

Primary Examiner—John Kight, III
Assistant Examiner—M. L. Moore
Attorney, Agent, or Firm—Sherman & Shalloway

[57] ABSTRACT

A thermoplastic polyurethan resin obtained by reacting (1) a polyol component with (2) an organic diisocyanate in a mole ratio, (1)/(2), of 0.8–1.3:0.5–1.2 in the presence, if desired, of a catalyst, said polyol component (1) comprising (A) a linear polyester polyol and/or polyether polyol having hydroxyl groups at both ends and/or (B) a diol free from a tertiary hydroxyl group, and
(C) a low-molecular-weight polyol having at least one tertiary hydroxyl group (C-1), and/or a polyester polyol and/or polyether polyol having a molecular weight of 500 to 6,000 and containing hydroxyl groups at both ends and at least one tertiary hydroxyl group in the molecular chain (C-2) prepared from said low-molecular-weight polyol (C-1), the proportions of (A), (B) and (C) in said polyol component (1) being such that the ratio of (C) to the sum of (A), (B) and (C) is from 0.05 to 1.

17 Claims, 3 Drawing Figures

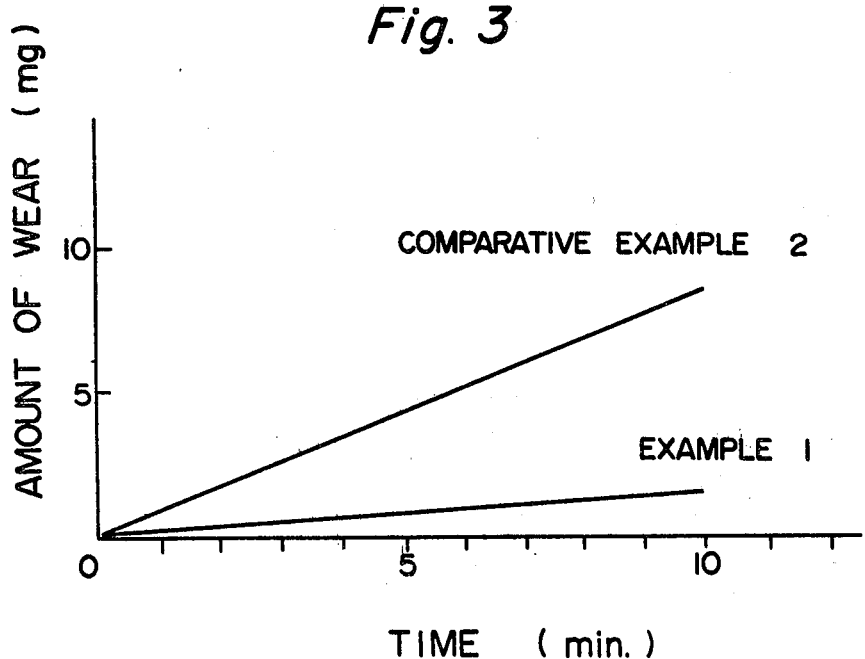

THERMOPLASTIC POLYURETHAN RESIN

This invention relates to a novel polyurethan resin, and more specifically, to a thermoplastic polyurethan resin having improved properties.

Thermoplastic polyurethan resins have excellent elasticity, suppleness, abrasion resistance, cold resistance and strength, and find extensive use as molding materials in injection molding, extrusion molding, etc., materials for the production of artificial leathers, elastic fibers, paints and adhesives, and materials for modifying various resins such as ABS resin, AS resin, polyvinyl chloride or its derivatives, and cellulose derivatives. However, they suffer the defect of having poor heat resistance, hydrolysis resistance and wet heat resistance.

In recent years, a great deal of work has been done to develop their uses in printing inks, magnetic coating compositions, electrically conductive resins, magnetic rubbers, etc. However, since for example, the dispersibility of a magnetic powder in the thermoplastic polyurethane resins is low, products having satisfactory electromagnetic properties cannot be obtained.

Various attempts have previously been made to remove the aforesaid defect. It has been found impossible, however, to overcome this disadvantage without a deterioration in the inherent properties of thermoplastic polyurethane resins, i.e. excellent elasticity, abrasion resistance, suppleness, cold resistance, strength, etc.

It is an object of this invention to provide a thermoplastic polyurethane resin which eliminates the aforesaid defect without a deleterious effect on its inherent excellent properties.

We have now found that a thermoplastic polyurethane resin conforming to the above object can be obtained by using a low-molecular-weight polyol having at least one tertiary hydroxyl group as a polyol component.

Thus, according to this invention, a novel thermoplastic polyurethan resin is provided by reacting (1) a polyol component with (2) an organic diisocyanate in a mole ratio, (1)/(2), of 0.8–1.3:0.5–1.2 in the presence, if desired, of a catalyst, said polyol component (1) comprising (A) a linear polyester polyol and/or polyether polyol having hydroxyl groups at both ends, and/or (B) a diol free from a tertiary hydroxyl group, and (C) a low-molecular-weight polyol having at least one tertiary hydroxyl group (C-1), and/or a polyester polyol and/or polyether polyol having a molecular weight of 500 to 6,000 and containing hydroxyl groups at both ends and at least one tertiary hydroxyl group in the molecular chain (C-2) prepared from said low-molecular-weight polyol (C-1), the proportions of (A), (B) and (C) being that the ratio of (C) to the sum of (A), (B) and (C) is from 0.05 to 1.

Primary and/or secondary hydroxyl groups may also be present at the ends of the thermoplastic polyurethane resin of this invention besides the tertiary hydroxyl group.

Examples of suitable organic diisocyanate (2) used in this invention include hexamethylene diisocyanate, lysine diisocyanate, isophorone diisocyanate, xylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4'-biphenyl diisocyanate, 3,3'-dimethylbiphenyl-4,4'-diisocyanate, 3,3'-dimethoxybiphenyl-4,4'-diisocyanate, and mixtures of these. Of these, 4,4'-diphenylmethane diisocyanate, hexamethylene diisocyanate, 2,5-tolylene diisocyanate and mixtures of these are preferred.

The hydroxyl-terminated linear polyester polyol and/or polyether polyol (A) used as an ingredient of the polyol component (1) preferably has a molecular weight of 500 to 6,000, and examples include polyether polyols such as polyethylene glycol, polypropylene glycol and polytetramethylene glycol. There can also be used polyester polyols obtained by polycondensing glycols such as ethylene glycol, 1,2-propylene glycol, 1,3-propylene glycol, 2,3-butylene glycol, 1,4-butylene glycol, 2,2'-dimethyl-1,3-propanediol, diethylene glycol, 1,5-pentamethylene glycol, 1,6-hexaneglycol, cyclohexane-1,4-diol and cyclohexane-1,4-dimethanol either singly or in combination, with dibasic acids such as succinic acid, maleic acid, adipic acid, glutaric acid, pimelic acid, suberic acid, azelaic acid, sebacic acid, phthalic acid, isophthalic acid, terephthalic acid, hexahydroterephthalic acid and hexahydroisophthalic acid, or the esters or halides of these acids. Polycaprolactone diols obtained by ring-opening addition polymerization of lactones such as ε-caprolactone in the presence of glycols are also useful.

The diol (B) free from a tertiary hydroxyl group used in this invention preferably has 2 to 10 carbon atoms. It may be one or more of the glycols used in the aforesaid polyesters. There can also be used diols resulting from the addition of 2 to 4 moles of ethylene oxide, propylene oxide, butylene oxide, etc. to bisphenol A or hydroquinone.

The ingredient (C) is essential in the polyol component (1) used in this invention. The low-molecular-weight polyol (C-1) having at least one tertiary hydroxyl group preferably has 3 to 6 hydroxyl groups and 4 to 10 carbon atoms. In addition to the tertiary hydroxyl group, primary or secondary hydroxyl group may be present. The primary hydroxyl is preferred as the other hydroxyl group. Accordingly, examples of useful polyols (C-1) include 1,2,3-hydroxy-2-methylpropane, 1,2,3-hydroxy-2-ethylpropane, 1,2,4-hydroxy-2-methylbutane, 1,2,5-hydroxy-2-methylpropane, 1,3,5-hydroxy-3-methylpentane, 1,3,6-hydroxy-3-methylhexane, 1,2,3,6-hydroxy-2,3-dimethylhexane, and 1,2,4,6-hydroxy-2,4-dimethylhexane either singly or in combination.

The ingredient (C-2) is a polyester polyol and/or polyether polyol having a molecular weight of 500 to 6,000, preferably 800 to 3,000. Examples of suitable polyols (C-2) are polypropylene ether polyol, polyethylene polyol and polybutylene polyol obtained by the addition of propylene oxide and/or ethylene oxide and/or butylene oxide to the polyols (C-1) containing a tertiary hydroxyl group. Other useful polyols (C-2) include polyester polyols obtained by polycondensing a mixture of the polyol (C-1) having a tertiary hydroxyl group and the glycol (A) with a dibasic acid or its ester or halide; polycaprolactone polyester polyols obtained by addition polymerization of lactones such as ε-caprolactone with a polyol having a tertiary hydroxyl group such as a triol, tetrol, pentol or hexol (or a mixture of such a polyol with the glycol (A)); and polycaprolactone polyester polyols obtained by addition polymerization of the aforesaid lactones with the aforesaid hydroxyl-containing polyols (C-1).

The polyol component (1) used in this invention contains the ingredients (A), (B) and (C) in such proportions that the ratio of (C) to the sum of (A)+(B)+(C) is from 0.05 to 1, preferably from 0.05 to 0.5, or from 0.8 to 1. Hence, the ingredient (C) is an essential polyol component. The ingredient (C) is either (C-1), or (C-2), or a mixture of (C-1) and (C-2). The proportion of (C) with respect to (A) and (B) is usually selected such that the mole ratio of (A) to (C-1) is from 1:0.05 to 1:3, preferably from 1:0.1 to 1:1, and the mole ratio of (B) to (C-1) is from 0:1 to 0.95:0.05. The mole ratio of (A) to (B) is preferably from 1:0 to 1:3.

Examples of the combination of (C) (i.e., (C-1) and (C-2)), (A) and (B) are shown below.

(1) (A)+(C-1)
(2) (A)+(C-2)
(3) (B)+(C-1)
(4) (B)+(C-2)
(5) (A)+(B)+(C-1)
(6) (A)+(B)+(C-2)
(7) (A)+(C-1)+(C-2)
(8) (B)+(C-1)+(C-2)
(9) (A)+(B)+(C-1)+(C-2)

Of these, (1) (A)+(C-1), (2) (A)+(C-2), (5) (A)+(B)+(C-1), and (7) (A)+(C-1)+(C-2) are preferred.

The preferred range of the mole ratio (C) to the sum of (A)+(B)+(C) differs depending upon the combination of the components (A), (B) and (C). For example, it is from 0.05 to 1 in the combinations (2) and (8), from 0.5 to 1 in the combination (4), and from 0.05 to 0.5 or from 0.8 to 1 in the other combinations given above.

The suitable mole ratio of the polyol component (1) to the organic diisocyanate used in this invention (OH/NCO ratio) is 0.8–1.3:0.5–1.2, preferably 0.95–1.1:0.8–1.05. Mole ratios outside the specified range are undesirable because the excellent properties contemplated by this invention cannot be obtained.

In reacting the polyol component (1) with the organic diisocyanate (2), a catalyst may be used, if desired. Examples of the catalyst are triethylamine, triethylenediamine, picoline, morpholine, dimethyltin diacetate, dibutyltin dilaurate, dimethyltin oxide and dibutyltin oxide.

The thermoplastic polyurethane resin in accordance with this invention has many desirable properties. These properties can be very much stabilized with utmost ease by incorporating stabilizers against ultraviolet light such as substituted benzotriazoles, stabilizers against heat and oxidation such as phenol derivatives.

The thermoplastic polyurethan resin obtained by this invention can be used in any desired form such as a solution, lumps or a powder according to the purpose of use.

Conventional methods can be used in producing the thermoplastic polyurethane resin of this invention. For example, there may be used a method which comprises mixing the reactants fully, if desired in the presence of a catalyst, casting the mixture onto a flat plate or a flat surface, heating it, cooling the product and then pulverizing it; a method comprising injecting the reaction mixture into an extruder; or a solution reaction method involving carrying out the reaction in an organic solvent such as dimethyl formamide, toluene, xylene, benzene, dioxane, cyclohexanone, methyl ethyl ketone, methyl isobutyl ketone, ethyl acetate and butyl acetate.

The thermoplastic polyurethan resin of this invention can be applied to various uses by utilizing its excellent properties. It can, for example, be utilized in magnetic coating compositions for magnetic recording media, various printing inks, magnetic rubbers, electrically conductive resins, etc. because the use of the polyol having a tertiary hydroxyl group (C) markedly improves pigment dispersibility.

The magnetic recording medium may be obtained by preparing a magnetic coating composition by adding a magnetic powder, various additives, another resin, a solvent, etc. to the polyurethan resin of this invention, and coating the resulting composition on a substrate such as a polyester film by means known per se to form a magnetic layer. The magnetic powder used may, for example, an oxide-type powder such as $\gamma$-$Fe_2O_3$, Co-containing $\gamma$-$Fe_2O_3$, $Fe_3O_4$ and $CrO_2$, or a metallic powder such as Fe, Co, Ni and an alloy of any of these. Examples of the solvent which can be used include ketones such as cyclohexanone, methyl isobutyl ketone and methyl ethyl ketone, esters such as ethyl acetate, hydrocarbons such as toluene, alcohols such as isopropyl alcohol, acid amides such as dimethyl formamide, ethers such as tetrahydrofuran and dioxane, and mixtures of these. If desired, the magnetic coating composition may further be incorporated with various additives generally used in the art, such as dispersing agents, lubricants, abrasives, and antistatic agents.

Furthermore, the thermoplastic polyurethane resin of this invention may be used as a two-package adhesive or paint in combination with a polyisocyanate by utilizing the active hydrogens of the polyol having a tertiary hydroxyl group.

Since the thermoplastic polyurethan resin of the invention has a network structure ascribable to the partial formation of a urethan linkage and its properties such as flowability, tackiness, wet heat resistance, permanent compression set and permanent elongation are improved, it is suitable for use in calendering, extrusion molding, injection molding, etc. Hence, it can be used in shoe soles, belts, film materials, sheet materials, automobile parts, etc.

The following non-limitative examples, taken in conjunction with the accompanying drawings, illustrate the present invention more specifically. In these examples, all parts are by weight.

In the accompanying drawings,

FIG. 3 is a graphic representation showing the relation to the time of the amount of wear of a magnetic recording tape produced by using each of the thermoplastic polyurethane resins obtained in Example 1 and Comparative Example 2.

EXAMPLE 1

Figure 1:
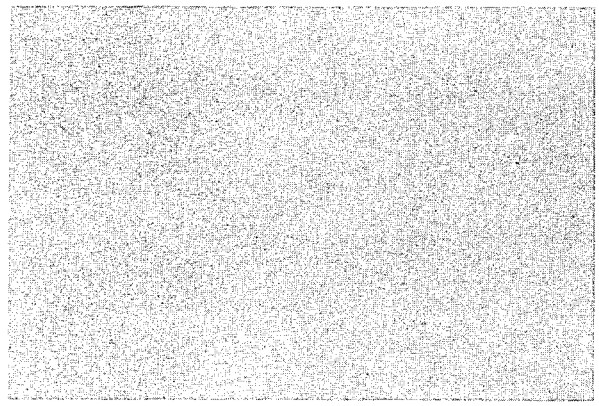
FIG. 1 is a microphotograph of a coated film containing a magnetic powder prepared from the thermoplastic polyurethan obtained in Example 1.

Two hundred parts (0.1 mole) of a polyesterdiol having a molecular weight of 2,000 (hydroxyl value 56.1) and prepared from ethylene glycol and adipic acid was mixed with 2.7 parts (0.02 mole) of 1,2,5-hydroxy-2-methylpentane and 0.04 part of dibutyltin dilaurate. The resulting polyol mixture was heated at 90° C., and mechanically mixed for about 1 minute with 20.1 parts of hexamethylene diisocyanate heated at 40° C.

The reaction mixture was poured into a vat heated at 120° C., and allowed to stand for 1 hour, and then further at 100° C. for 20 hours to complete the reaction.

The resulting thermoplastic polyurethan resin had a solution viscosity (resin concentration 20%, methyl ethyl ketone solution) of 515 cps (measured at 25° C. by a BM-type rotary viscometer). The presence of the unreacted tertiary hydroxyl group in the resulting polyurethan was determined from the peak at 70.6087 ppm in $^{13}C$ NMR (solvent deutero-chloroform, concentration 30%, 25 MHz, standard TMS).

COMPARATIVE EXAMPLE 1

Synthesis of polyurethan was attempted by the same method as in Example 1 by using polyester diol having a molecular weight of 2,000 (hydroxyl value 56.1) prepared from ethylene glycol and adipic acid, trimethylolpropane (having 3 primary hydroxyl groups), glycerol (having 2 primary hydroxyl groups and 1 secondary hydroxyl group), hexamethylene diisocyanate and dibutyltin dilaurate in the proportions shown in Table 1.

TABLE 1

| | Proportions (parts by weight) | | | |
|---|---|---|---|---|
| | Comparative Example | | | |
| Components added | 1-1 | 1-2 | 1-3 | 1-4 |
| Polyester diol | 200 | 200 | 200 | 200 |
| Trimethylolpropane | 0.62 | 2.48 | — | — |
| Glycerol | — | — | 0.46 | 1.84 |
| Hexamethylene diisocyanate | 17.6 | 20.1 | 17.6 | 20.1 |
| Dibutyltin dilaurate | 0.04 | 0.04 | 0.04 | 0.04 |

All of the resulting products were insoluble in methyl ethyl ketone, and insoluble or partly swellable in dimethyl formamide. For this reason, these products were unsuitable as binders for magnetic tapes.

COMPARATIVE EXAMPLE 2

Two hundred parts (0.1 mole) of polyesterdiol having a molecular weight of 2,000 and prepared from ethylene glycol and adipic acid was mixed with 1.8 parts (0.02 mole) of 1,4-butanediol and 0.04 part of dibutyltin dilaurate. The polyol mixture was mixed with 20.1 parts of hexamethylene diisocyanate. The mixture was reacted in the same way as in Example 1 to give a thermoplastic polyurethan resin having a solution viscosity of 750 cps.

A film having a thickness of 100 microns was prepared from a methyl ethyl ketone solution of each of the resins obtained in Example 1 and Comparative Example 2 in a resin concentration of 20%. The films were left to stand in an atmosphere kept at a temperature of 70° C. and a relative humidity of 95% for one week and two weeks respectively. The properties and solution viscosities of these films were measured; and the results are shown in Table 2.

The plasticizing effects of the resins obtained in Example 1 and Comparative Example 2 are shown in Table 3.

TABLE 2

| Treatment at 70° C. and 95% RH | Example 1 | | | Comparative Example 2 | | |
|---|---|---|---|---|---|---|
| | Before | One week later | Two weeks later | Before | One week later | Two weeks later |
| Tensile strength (kg/cm$^2$) | 350 | 340 | 330 | 380 | 250 | 130 |
| (percent retention) | (100) | (97) | (94) | (100) | (66) | (35) |
| Elongation (%) | 750 | 770 | 800 | 850 | 920 | 1,030 |
| (percent retention) | (100) | (103) | (107) | (100) | (108) | (121) |
| 100% modulus (kg/cm$^2$) | 40 | 40 | 40 | 50 | 44 | 42 |
| (percent retention) | (100) | (100) | (100) | (100) | (88) | (83) |
| Solution viscosity (cps at 25° C.) | 515 | 500 | 490 | 750 | 350 | 210 |
| (percent retention) | (100) | (97) | (95) | (100) | (47) | (28) |
| Mole ratio of (C) to the sum of (A) + (B) + (C) | | 0.167 | | | — | |

The properties of the films were measured by an autograph (Model IM-100, a product of Shimadzu Seisakusho Ltd.). The solution viscosity (which is a measure of molecular weight) was measured by using a methyl ethyl ketone solution of the sample having a nonvolatile content of 20% by means of a BM-type rotary viscometer (rotor #2; 30 revolutions).

Table 2 shows that the thermoplastic polyurethan resin obtained in Example 1 had excellent wet heat resistance. It is presumed from the results that a part of the tertiary hydroxyl group formed a urethan linkage and therefore, the resin had a network structure.

(1) Method for preparation of test samples (1-1) Blending method
Device: vapor-heating type 8-inch mixing roll
Processing condition: surface temperature 150°–160° C., mixing time 10 minutes
(1-2) Preparation of a test sample
A sheet-like mixture was taken out from the mixing roll, and press-formed into a sheet having a thickness of 1 mm.
Molding conditions:
pressing pressure 100–120 kg/cm$^2$
temperature 160° C., time 5 minutes),
cooling pressure 130–150 kg/cm$^2$
(temperature 20° C., time 5 minutes)

(2) Methods of testing properties (2-1) Tensile test: JIS K6301 autograph
(2-2) Clash-berg low-temperature softening temperature: JIS K6723

TABLE 3

| | A | B |
|---|---|---|
| Formulation (parts) | | |
| Thermoplastic polyurethan resin of Example 1 | 50 | — |
| Thermoplastic polyurethan resin of Comparative Example 2 | — | 50 |
| Zeon PVC 103EP (*1) | 50 | 50 |
| Epocizer W-109EL (*2) | 5 | 5 |
| Calcium stearate | 1 | 1 |
| Physical properties | | |
| Hardness (JIS A) | 80 | 88 |
| Tensile strength (kg/cm$^2$) | 200 | 220 |
| Elongation (%) | 700 | 650 |
| 100% Modulus (kg/cm$^2$) | 30 | 40 |
| Low-temperature softening | −35 | −22 |

TABLE 3-continued

|  | A | B |
|---|---|---|
| temperature (°C.) | | |

(*1): vinyl chloride resin made by Nippon Zeon Co., Ltd.
(*2): epoxy-type stabilizer made by Dainippon Ink & Chemicals, Inc.

It is seen from the data of the 100% modulus and low-temperature softening temperature in Table 3 that the plasticizing effect of the thermoplastic polyurethane resin of Example 1 was superior.

EXAMPLE 2

Three hundred parts (0.2 mole) of polyester diol having a molecular weight of 1,500 (hydroxyl value 74.8) and prepared from 1,4-butylene glycol and adipic acid, 45 parts (0.5 mole) of 1,4-butylene glycol and 8.0 parts (0.06 mole) of 1,2,5-hydroxy-2-methylpentane were mixed, and then 190 parts of 4,4'-diphenylmethane diisocyanate was added. The mixture was reacted in the same way as in Example 1.

The unreacted tertiary hydroxyl group in the polymer was determined by the same method as in Example 1.

The polymer was pulverized and dried and injection-molded into a 2 mm-thick sheet by means of a 3,5-ounce injection-molding machine (made by Niigata Engineering Co., Ltd.) at an injecting pressure of 600 kg/cm² and a temperature of 200° C.

COMPARATIVE EXAMPLE 3

Three hundred parts of polyester diol having a molecular weight of 1,500 (hydroxyl value 74.8) and prepared from 1,4-butylene glycol and adipic acid and 54 parts of 1,4-butylene glycol were mixed, and then 200 parts of 4,4'-diphenylmethane diisocyanate was added. The mixture was reacted and then molded into a 2 mm-thick sheet by the same procedure as in Example 2.

The sheets obtained in Example 2 and Comparative Example 3 were left to stand in an atmosphere kept at a temperature of 90° C. and a relative humidity of 95% for one week and two weeks respectively. The properties and melt viscosities of these sheets were measured. The results are shown in Table 4.

TABLE 4

| Treatment at 90° C. and 95% RH | Example 2 | | | Comparative Example 3 | | |
|---|---|---|---|---|---|---|
| | Before | One week later | Two weeks later | Before | One week later | Two weeks later |
| Hardness (JIS A) | 92 | 91 | 91 | 93 | 91 | 90 |
| (percent retention) | (100) | (99) | (99) | (100) | (98) | (97) |
| Tensile strength (kg/cm²) | 450 | 430 | 425 | 460 | 290 | 200 |
| (percent retention) | (100) | (96) | (94) | (100) | (63) | (43) |
| Elongation (%) | 600 | 610 | 640 | 610 | 730 | 810 |
| (percent retention) | (100) | (102) | (100) | (100) | (120) | (133) |
| 100% Modulus (kg/cm²) | 85 | 83 | 83 | 90 | 84 | 80 |
| (percent retention) | (100) | (98) | (98) | (100) | (93) | (89) |
| Melt viscosity (poises at 200° C.) (× 10⁵) | 5.5 | 4.8 | 3.5 | 6.3 | 2.5 | 0.9 |
| (C)/(A) + (B) + (C) (mole) | 0.08 | | | — | | |

Properties of the sheet: Dumbell #3 in accordance with JIS K-630
Melt viscosity: Koka-type flow tester (Model 301, a product of Shimadzu Seisakusho Co., Ltd.) Die diameter: 1 mm, length: 1 mm, load: 30 kg The results given in Table 4 led to the determination that the thermoplastic polyurethan in Example 2 had superior wet heat resistance.

APPLICATION EXAMPLE 1

| Thermoplastic polyurethane resin obtained in Example 1 or Comparative Example 2 | 150 parts |
|---|---|
| Methyl ethyl ketone | 680 parts |
| Toluene | 85 parts |
| Isopropyl alcohol | 85 parts |
| γ-Fe₂O₃ magnetic powder | 150 parts |

Figure 2:
FIG. 2 is a microphotograph of a coated film containing a magnetic powder prepared from the thermoplastic polyurethane resin obtained in Comparative Example 2.

The above ingredients were kneaded for 50 hours in a ball mill to prepare a magnetic coating composition. The resulting coating composition was coated on a 6 μ-thick polyethylene terephthalate film and dried so that the thickness of the coated layer after drying was about 12 microns. The dispersibility of the magnetic powder was examined under microscope. A microphotograph of the coated film prepared by using the resin of Example 1 is shown in FIG. 1, and that of the coated film prepared by using the resin of Comparative Example 2, in FIG. 2.

This led to the confirmation that the thermoplastic polyurethane resin of this invention permitted good dispersion of the magnetic powder.

APPLICATION EXAMPLE 2

| Thermoplastic polyurethane resin obtained in Example 1 or Comparative Example 2 | 40 parts |
|---|---|
| Vinylite VAGD (vinyl chloride/vinyl acetate copolymer made by Union Carbide Corporation) | 60 parts |
| Cyclohexanone | 300 parts |
| Methyl ethyl ketone | 300 parts |
| γ-Fe₂O₃ magnetic powder | 350 parts |
| Carbon black | 12 parts |
| Lubricant | 5 parts |
| Burnock D-750 (low-molecular-weight polyisocyanate made by Dainippon Ink & Chemicals, Inc.) | 10 parts |

The above ingredients were kneaded for 24 hours in a ball mill to prepare a magnetic coating composition. The coating composition was coated on a 6 μ-thick polyethylene terephthalate film and dried so that the thickness of the coated layer after drying was about 12 microns. The coated film was cut to a predetermined width to form a magnetic recording tape.

The wear properties of the magnetic recording tapes obtained in Application Example 2 were measured. The wear resistance was expressed by the amount of the coated layer (magnetic surface) of each tape worn as a result of rubbing with a rotating disc, with respect to the time elapsed. The results are plotted in FIG. 3.

It is seen from FIG. 3 that the magnetic tape prepared by using the thermoplastic polyurethan resin of Example 1 showed superior durability.

EXAMPLE 3

A 500-liter heatable reactor equipped with a thermometer, a stirrer, and a reflux condenser was charged with 104.3 parts of methyl ethyl ketone (MEK for short), 136.5 parts (0.091 mole) of polyester diol having a molecular weight of 1,500 (hydroxyl value 74.8) and prepared from ethylene glycol and adipic acid, 1.2 parts (0.09 mole) of 1,2,5-hydroxy-2-methylpentane and 0.04 part of dibutyltin dilaurate. They were heated to 60° C. and uniformly mixed stirring.

Then, 18.8 parts (0.075 mole) of 4,4'-diphenylmethane diisocyanate (MDI for short) kept at 40° C. was added to the mixture, and the reaction was started. The viscosity of the reaction was measured during the reaction. In 3 hours after the initiation of start of the reaction, the viscosity became constant. Thus, the reaction was completed. Then, 53.8 parts of MEK was added to the reaction product to prepare a thermoplastic polyurethan resin composition having a nonvolatile content of 50%.

The resulting thermoplastic polyurethane resin had a number average molecular weight (to be referred to hereinbelow simply as molecular weight; determined by gel permeation chromatography and calculated by comparison with the molecular weights of polystyrene resins having known molecular weights as a standard) of 6,150. The presence of the unreacted tertiary hydroxyl group and the terminal primary hydroxyl group in the polyurethan was determined as a result of the detection of peaks at 70.608 ppm and 61.2542 ppm respectively in carbon NMR (solvent deuterochloroform; concentration 30%; 25 MHZ; standard TMS).

EXAMPLE 4

In Example 3, 100 parts (0.1 mole) of polytetrahydrofuran (hydroxyl value 112.2) having a molecular weight of 1,000 was used instead of 136.5 parts of the polyester diol; the amount of MEK was changed to 91.1 parts; the amount of 1,2,5-hydroxy-2-methylpentane was changed to 6.7 parts (0.05 mole); the amount of dibutyltin dilaurate was changed to 0.03 part; and the amount of MDI was changed to 30.0 parts (0.12 mole). After the reaction, 45.6 parts of MEK was further added to the reaction solution to prepare a thermoplastic polyurethan resin solution having a non-volatile content of 50%. The polyurethan had a molecular weight (measured in the same way as in Example 3) of 4,300. The presence of the unreacted tertiary hydroxyl group and the terminal primary hydroxyl group in this polyurethan was determined in the same way as in Example 3.

EXAMPLE 5

In Example 3, 150 parts (0.05 mole) of polycaprolactone (hydroxyl value 37.4) having a molecular weight of 3,000 prepared by ring-opening addition polymerization in the presence of ethylene glycol as an initiator was used instead of 136.5 parts of polyester diol; 15 parts (0.025 mole) of polycaprolactone (hydroxyl value 187) having a molecular weight of 600 prepared by ring-opening addition polymerization in the presence of 1,2,5-hydroxy-2-methylpentane was used instead of 1,2,5-hydroxy-2-methylpentane; the amount of MEK was changed to 118.3 parts; the amount of dibutyltin dilaurate was changed to 0.05 part; and the amount of MDI was changed to 12.5 parts (0.05 mole). After the reaction, 59.2 parts of MEK was added to the reaction solution to prepare a thermoplastic polyurethan resin solution having an involatile content of 50%. The polyurethan had a molecular weight of 7,250. The presence of the unreacted tertiary hydroxyl group and the terminal primary hydroxyl group in the polyurethane was determined in the same way as in Example 3.

COMPARATIVE EXAMPLE 4

A thermoplastic polyurethane resin solution having an involatile content of 50% was prepared in the same way as in Example 3 except that 0.8 part of 1,4-butanediol was used instead of 1.2 parts of 1,2,5-hydroxy-2-methylpentane. The polyurethane had a molecular weight of 4,100.

The properties of films from the polyurethane obtained in Examples 3, 4 and 5 and Comparative Example 4 were measured by the same methods as in Example 1, and the results are shown in Table 5.

TABLE 5

| Treatment at 70° C. and 95% RH | Example 3 | | | Example 4 | | | Example 5 | | | Comparative Example 4 | | |
|---|---|---|---|---|---|---|---|---|---|---|---|---|
| | Before | One week later | Two weeks later | Before | One week later | Two weeks later | Before | One week later | Two weeks later | Before | One week later | Two weeks later |
| Tensile strength (kg/cm$^2$) | 345 | 324 | 310 | 330 | 330 | 300 | 370 | 359 | 340 | 315 | 270 | 205 |
| (Percent retention) | (100) | (94) | (90) | (100) | (100) | (93) | (100) | (97) | (92) | (100) | (85) | (65) |
| Elongation (%) | 570 | 600 | 627 | 600 | 630 | 630 | 525 | 575 | 575 | 650 | 715 | 745 |
| (percent retention) | (100) | (105) | (110) | (100) | (105) | (105) | (100) | (110) | (110) | (100) | (110) | (115) |
| 100% Modulus (kg/cm$^2$) | 70 | 70 | 67 | 80 | 80 | 80 | 55 | 53 | 53 | 75 | 60 | 45 |
| (percent retention) | (100) | (100) | (95) | (100) | (100) | (100) | (100) | (97) | (97) | (100) | (80) | (60) |
| (C)/(A) + (B) + (C) (mole) | 0.5 | | | 0.33 | | | 0.33 | | | — | | |

APPLICATION EXAMPLE 3

| | |
|---|---|
| Thermoplastic polyurethane resin solution (nonvolatile content 50%) of each of Examples 3 to 5 and Comparative Example 4 | 200 parts |
| Cyclohexanone | 280 parts |
| Methyl ethyl ketone | 180 parts |
| $\gamma$-Fe$_2$O$_3$ | 300 parts |

The above ingredients were kneaded in a ball mill for a period of 15, 30, 50 and 70 hours respectively. Each of the resulting magnetic coating compositions was coated on a 10 $\mu$-thick polyethylene terephthalate film and dried so that the thickness of the coated layer after drying was 10 microns. The surface condition of the magnetic layer of each of the coated films was observed under microscope (40X), and the dispersibility of the magnetic powder was assessed. The results are shown in Table 6.

TABLE 6

| Test item<br>Kneading time | Dispersibility of the<br>magnetic power | | | | Flowability<br>of the magnet-<br>ic coating<br>composition |
|---|---|---|---|---|---|
| (hours) | 15 | 30 | 50 | 70 | 70 |
| Example 3 | | | | | |
| Example 4 | | | | | |
| Example 5 | | | | | |
| Comparative<br>Example 4 | | X | Δ | | |

The assessments given in Table 6 were based on the following standard.
  : Very good
  : Good
Δ: Fair
X: Inferior
XX: Very inferior

EXAMPLE 6

A thermoplastic polyurethan resin having a solution viscosity of 3,000 cps was prepared in the same way as in Example 1 by using 2,000 parts (0.1 mole) of polycaprolactone having a molecular weight of 2,000 prepared by ring-opening polymerization in the presence of 1,3,5-hydroxy-3-methylpentane as an initiator, 0.04 part of dibutyltin dilaurate and 17 parts (0.128 mole) of tolylene diisocyanate (80:20 mixture of 2,4-tolylene diisocyanate and 2,6-tolylene diisocyanate).

EXAMPLE 7

A thermoplastic polyurethan resin having a solution viscosity of 350 cps was prepared in the same way as in Example 1 by using 150 parts (0.05 mole) of polyester diol having a molecular weight of 3,000 and derived from adipic acid, 1,6-hexanediol and 2,2-dimethylpropanediol-1,3 (mole ratio of 1,6-hexanediol/2,2-dimethylpropanediol 90/10; hydroxyl value 37.4), 6.7 parts (0.05 mole) of 1,3,5-hydroxy-3-methylpentane and 24.0 parts (0.096 mole) of 4,4′-diphenylmethane diisocyanate.

EXAMPLE 8

A thermoplastic polyurethan resin having a solution viscosity of 830 cps was prepared in the same way as in Example 1 by using 160 parts (0.08 mole) of polycaprolactone polyol having a molecular weight of 2,000 (hydroxyl value 56.1) prepared by ring-opening addition polymerization in the presence of ethylene glycol as an initiator, 60 parts (0.02 mole) of polycaprolactone polyol (hydroxyl value 37.4) having a molecular weight of 3,000 prepared by ring-opening addition polymerization in the presence of 1,3,5-hydroxy-3-methylpentane as an initiator, 2.0 parts (0.015 mole) of 1,3,5-hydroxy-3-methylpentane and 18.8 parts (0.112 mole) of hexamethylene diisocyanate.

COMPARATIVE EXAMPLE 5

A thermoplastic polyurethan resin having a solution viscosity of 3,300 cps was prepared in the same way as in Example 1 except that 200 parts (0.1 mole) of polycaprolactone polyol having a molecular weight of 2,000 prepared by ring-opening addition polymerization in the presence of ethylene glycol as an initiator, 0.04 part of dibutyltin dilaurate and 17.6 parts (0.101 mole) of tolylene diisocyanate were used.

COMPARATIVE EXAMPLE 6

A thermoplastic polyurethan resin having a solution viscosity of 300 cps was produced in the same way as in Example 1 except that 150 parts (0.05 mole) of the same polyester diol having a molecular weight of 3000 as in Example 7, 4.5 parts (0.05 mole) of 1,4-butanediol and 24 parts (0.096 mole) of 4,4′-diphenylmethane diisocyanate were used.

The properties of films prepared from the thermoplastic polyurethan resins obtained in Examples 6 to 8 and Comparative Examples 5 and 6 were measured in the same way as in Example 1. The results are shown in Table 7.

TABLE 7

| Treatment at 70° C. and 95% RH | Example 6 | | | Example 7 | | | Example 8 | | | Comparative Example 5 | | | Comparative Example 6 | | |
|---|---|---|---|---|---|---|---|---|---|---|---|---|---|---|---|
| | Be-<br>fore | One<br>week<br>later | Two<br>weeks<br>later | Be-<br>fore | One<br>week<br>later | Two<br>weeks<br>later | Be-<br>fore | One<br>week<br>later | Two<br>weeks<br>later | Be-<br>fore | One<br>week<br>later | Two<br>weeks<br>later | Be-<br>fore | One<br>week<br>later | Two<br>week<br>later |
| Tensile strength (kg/cm$^2$) | 510 | 510 | 485 | 520 | 520 | 505 | 480 | 485 | 480 | 450 | 270 | 180 | 470 | 330 | 260 |
| (percent retention) | (100) | (100) | (95) | (100) | (100) | (97) | (100) | (101) | (100) | (100) | (60) | (40) | (100) | (70) | (55) |
| Elongation (%) | 730 | 752 | 765 | 850 | 850 | 875 | 700 | 730 | 710 | 750 | 825 | 600 | 800 | 840 | 680 |
| (percent retention) | (100) | (103) | (105) | (100) | (100) | (103) | (100) | (104) | (101) | (100) | (110) | (80) | (100) | (105) | (85) |
| 100% Modulus (kg/cm$^2$) | 65 | 65 | 65 | 55 | 55 | 55 | 75 | 77 | 75 | 70 | 53 | 39 | 50 | 40 | 33 |
| (percent retention) | (100) | (100) | (100) | (100) | (100) | (100) | (100) | (103) | (103) | (100) | (75) | (55) | (100) | (80) | (65) |
| Solution viscosity (cps at 25° C.) | 3000 | 2950 | 2800 | 350 | 350 | 335 | 830 | 800 | 810 | 3300 | 1500 | 600 | 300 | 240 | 180 |
| (percent retention) | (100) | (98) | (93) | (100) | (100) | (96) | (100) | (96) | (98) | (100) | (45) | (18) | (100) | (80) | (60) |
| (C)/(A) + (B) + (C) (mole) | 1 | | | 0.5 | | | 0.3 | | | — | | | — | | |

What we claim is:

1. A thermoplastic polyurethan resin obtained by reacting (1) a polyol component with (2) an organic diisocyanate in a mole ratio, (1)/(2), of 0.8–1.3:0.5–1.2 in the presence, if desired, of a catalyst, said polyol component (1) comprising
   (A) a linear polyester polyol and/or polyether polyol having hydroxyl groups at both ends and/or (B) a diol free from a tertiary hydroxyl group, and
   (C) a low-molecular-weight polyol having at least one tertiary hydroxyl group (C-1), and/or a polyester polyol and/or polyether polyol having a molecular weight of 500 to 6,000 and containing hydroxyl groups at both ends and at least one tertiary hydroxyl group in the molecular chain (C-2) prepared from said low-molecular-weight polyol (C-1), the proportions of (A), (B) and (C) in said polyol component (1) being such that the ratio of (C) to the sum of (A), (B) and (C) is from 0.05 to 1.

2. The resin of claim 1 wherein the polyester polyol and/or polyether polyol (A) is present and has a molecular weight of 500 to 6,000.

3. The resin of claim 1 or 2 wherein the diol (B) in present and has 2 to 10 carbon atoms.

4. The resin of claim 2 wherein the low-molecular-weight polyol (C-1) is present and has 3 to 6 hydroxyl groups and 4 to 10 carbon atoms.

5. The resin of any one of claims 1, 2 or 4 wherein the polyester polyol and/or polyether polyol (C-2) is present and has a molecular weight of 800 to 3,000.

6. The resin of any one of claims 1, 2 or 4 wherein the mole ratio of (C) to the sum of (A), (B) and (C) is from 0.05 to 0.5 or from 0.8 to 1.

7. A process for producing a thermoplastic polyurethane resin which comprises reacting (1) a polyol component with (2) an organic diisocyanate in a mole ratio, (1)/(2), of 0.8–1.3:0.5–1.2 in the presence, if desired, of a catalyst, said polyol component (1) comprising
   (A) a linear polyester polyol and/or polyether polyol having hydroxyl groups at both ends and/or (B) a diol free from a tertiary hydroxyl group, and
   (C) a low-molecular-weight polyol having at least one tertiary hydroxyl group (C-1), and/or a polyester polyol and/or polyether polyol having a molecular weight of 500 to 6,000 and containing hydroxyl groups at both ends and at least one tertiary hydroxyl group in the molecular chain (C-2) prepared from said low-molecular-weight polyol (C-1),
   the proportions of (A), (B) and (C) in said polyol component (1) being such that the ratio of (C) to the sum of (A), (B) and (C) is from 0.05 to 1.

8. The process of claim 7 wherein the polyester polyol and/or polyether polyol (A) is used and has a molecular weight of 500 to 6,000.

9. The process of claim 7 or 8 wherein the diol (B) is used and has 2 to 10 carbon atoms.

10. The process of any one of claims 7, or 8 wherein the low-molecular-weight polyol (C-1) is used and has 3 to 6 hydroxyl groups and 4 to 10 carbon atoms.

11. The process of any one of claims 7 or 8 wherein the polyester polyol and/or polyether polyol (C-2) is used and has a molecular weight of 800 to 3,000.

12. The process of any one of claims 7 or 8 wherein the mole ratio of (C) to the sum of (A), (B) and (C) is from 0.05 or from 0.8 to 1.

13. A magnetic coating composition comprising a magnetic powder, the resin of claim 1 and a solvent for said resin.

14. An adhesive composition comprising the resin of claim 1 and a polyisocyanate.

15. A molded article prepared by using the resin of claim 1.

16. The resin of claim 1 wherein the low-molecular-weight (C-1) is present and has 3 to 6 hydroxyl groups and 4 to 10 carbon atoms.

17. The resin of claim 4 wherein the diol (B) is present and has 2 to 10 carbon atoms.

* * * * *